United States Patent [19]

Ramazzotti et al.

[11] 4,012,186

[45] Mar. 15, 1977

[54] PANEL FORMING DEVICE

[75] Inventors: Dario J. Ramazzotti, Tallmadge; Geza A. Thiry, Ravenna; James Genis, Clinton, all of Ohio

[73] Assignee: McNeil Corporation, Akron, Ohio

[22] Filed: Mar. 19, 1975

[21] Appl. No.: 560,094

[52] U.S. Cl. .................................. 425/123; 249/93; 425/127; 425/129 R; 425/150; 425/442; 425/817 R; 425/DIG. 33

[51] Int. Cl.² ........................................ B29D 27/04

[58] Field of Search ............... 52/DIG. 4; 264/46.5, 264/DIG. 83; 249/93, 112, 113, 123, 125, 136, 63, 151, 158, 170, 171, 172; 425/4 R, 817 R, 116, 123, 127, 129, 375, DIG. 33, 150, 135, 147, 260, 258, 447, 449, 468, 441, 443; 156/78, 79

[56] References Cited

UNITED STATES PATENTS

| 785,272 | 3/1905 | Robbins | 249/158 X |
|---|---|---|---|
| 2,328,662 | 9/1943 | Meredith et al. | 249/136 X |
| 3,112,163 | 11/1963 | Alderfer | 52/DIG. 4 |
| 3,161,911 | 12/1964 | Mathews | 425/817 R X |
| 3,412,431 | 11/1968 | Lemelson | 425/145 X |
| 3,523,997 | 8/1970 | Hennig | 425/453 X |
| 3,621,522 | 11/1971 | Woodhall | 425/817 R X |
| 3,712,771 | 1/1973 | White et al. | 425/127 X |
| 3,759,479 | 9/1973 | Howell et al. | 425/817 R X |
| 3,813,463 | 5/1974 | Conger | 425/817 R X |
| 3,837,769 | 9/1974 | Erlenbach | 425/4 R |

*Primary Examiner*—Francis S. Husar
*Assistant Examiner*—Mark Rosenbaum
*Attorney, Agent, or Firm*—Hamilton, Renner & Kenner

[57] ABSTRACT

Disclosed is a device for making panels, such as wall panels, particularly of the type having metallic skins with a foam insulation therebetween. A movable carriage supports temperature controlled mold platens which can carry the skin material and which swing about a common axis to open and close. The carriage is positioned under a moving nozzle assembly which dispenses the insulation material between the skins. Means are provided to form male and female ends for the panels for interlock with other panels. In addition, means are provided so that the apparatus can be readily adjusted to form panels of varying widths.

25 Claims, 11 Drawing Figures

PANEL FORMING DEVICE

BACKGROUND OF THE INVENTION

This invention relates to an apparatus for making wall panels. More particularly, this invention relates to an apparatus for making panels consisting of sidewall forming skins with an insulation material therebetween.

There is very little prior art, of which we are aware, in the automated manufacture of insulated panel material. Generally such panels have been manufactured in a watchcase type mold arrangement wherein one skin carrying mold section is swung away from a second stationary skin carrying mold section for loading skins therein and removing the finished panel therefrom. Typically these panels have been made in a vertically acting press with the insulation material being injected by a large tube through the end of the panel. Such manufacture is restricted both in capacity and in versatility.

Such devices are relatively crude in nature in that they are incapable of being adapted to forming multiple width panels, are not suited for mass production procedures, require manual closure of the ends after the area between the skins is filled with the insulation material, and provide no means for temperature controlled forming of the insulation material.

SUMMARY OF THE INVENTION

It is therefore a primary object of the present invention to provide a substantially automated system for the manufacture of insulated wall panels.

It is another object of the present invention to provide a system, as above, which is capable of manufacturing insulated wall panels of multiple widths.

It is yet another object of the present invention to provide a system, as above, wherein a finished panel may be unloaded and skins for a new panel loaded at the same time as insulation material is being injected into a second set of skins.

It is a further object of the present invention to provide a system, as above, which provides for the automatic closure of the ends of the panels to form with the skins a mold enclosure for the insulation material.

It is a still further object of the present invention to provide a system, as above, which produces panels having male and female ends for interlock with other panels.

It is an additional object of the present invention to provide a system, as above, which is temperature controlled for proper formation of the insulation material.

It is still another object of the present invention to provide a system, as above, which provides for the automatic dispensing of the insulation material between the skins of the panels.

These and other objects of the present invention, which will become apparent from the following description, are accomplished by the means hereinafter described and claimed.

In general, an apparatus for making panels having two sidewall forming skins and an insulation material therebetween includes two mold carrying platens at least one of which swings about an axis from an open position for unloading finished panels and loading skins to a closed position for receiving the insulation material. Means are provided to close the ends of the panels thereby providing an enclosure to receive and form the insulation material. The apparatus can be mounted on a carriage for movement within a framework that carries the nozzle for dispensing the insulation material. Relative movement between the carriage and the nozzle affects the application of the insulation material.

DESCRIPTION OF THE PREFERRED EMBODIMENT

Figure 1:
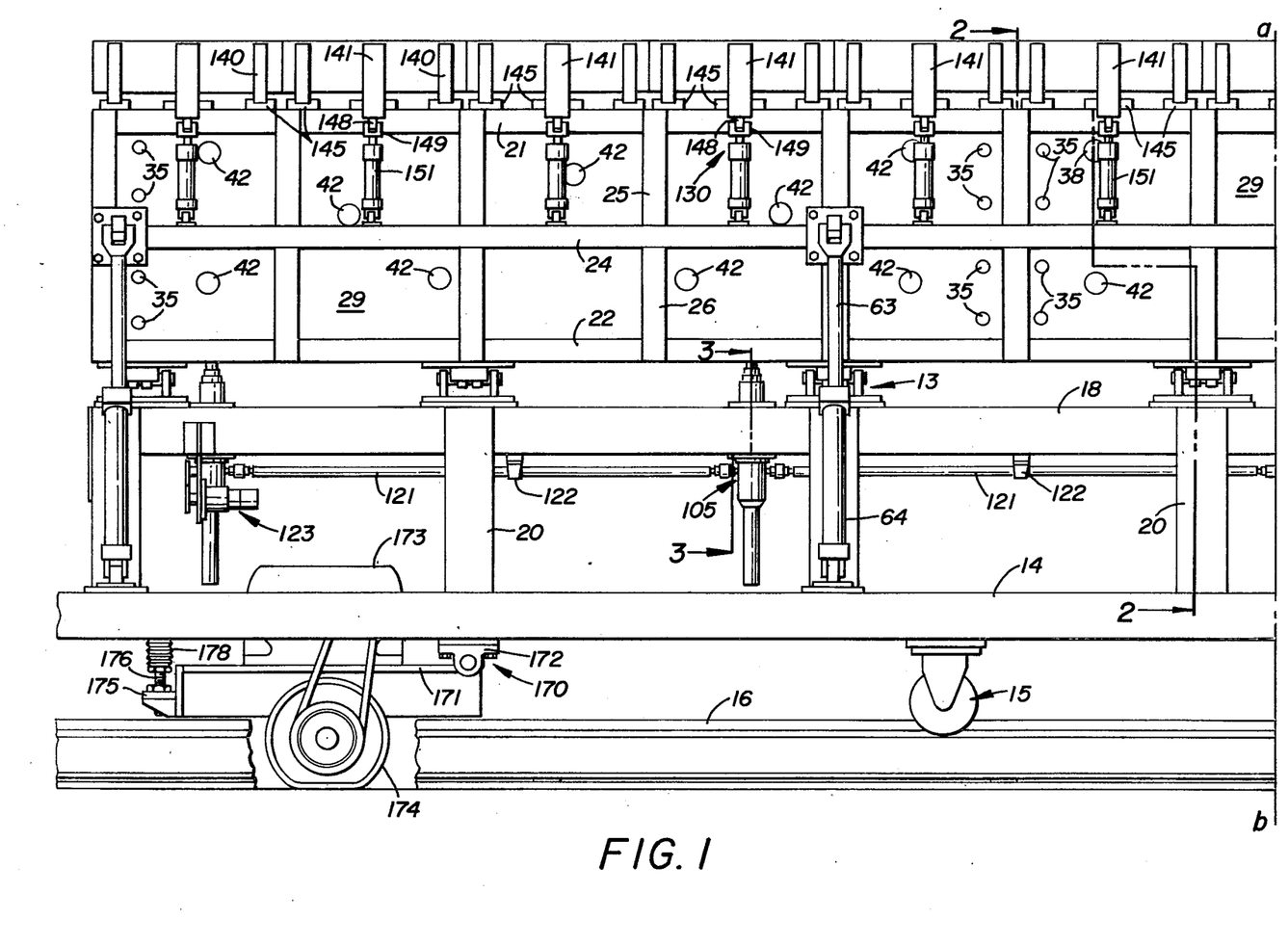
FIGS. 1 and 1A constitute a composite side elevational view of the present invention being broken along match lines $ab-a'b'$ with FIG. 1A being foreshortened to omit showing repetitive structure.

A longitudinally extending carriage, indicated generally by the numeral 10 in FIG. 1, includes an upper framework section, generally indicated by the numeral 11, and a lower framework section, generally indicated by the numeral 12. Carriage sections 11 and 12 are connected by a plurality of longitudinally spaced hinge assemblies 13 to be hereinafter described in detail with particular reference to FIGS. 4 and 5.

Lower framework section 12 includes a lower base plate structure 14 which carries a plurality of longitudinally spaced wheel assemblies 15 which ride on longitudinally extending tracks 16. While only one track 16 is shown in the drawings (FIG. 1), it is to be understood that another track 16 runs parallel to the track shown with additional wheel assemblies 15 mounted on the other lateral side of base plate 14. Lower framework section 12 also includes a longitudinally extending hinge support beam 18 which is carried by a vertical support 19 (FIG. 2A) and angled supports 20, supports 19 and 20 being mounted on base plate structure 14. Supports 20 are longitudinally spaced along carriage 10 to provide suitable strength to support beam 18.

Figure 2:
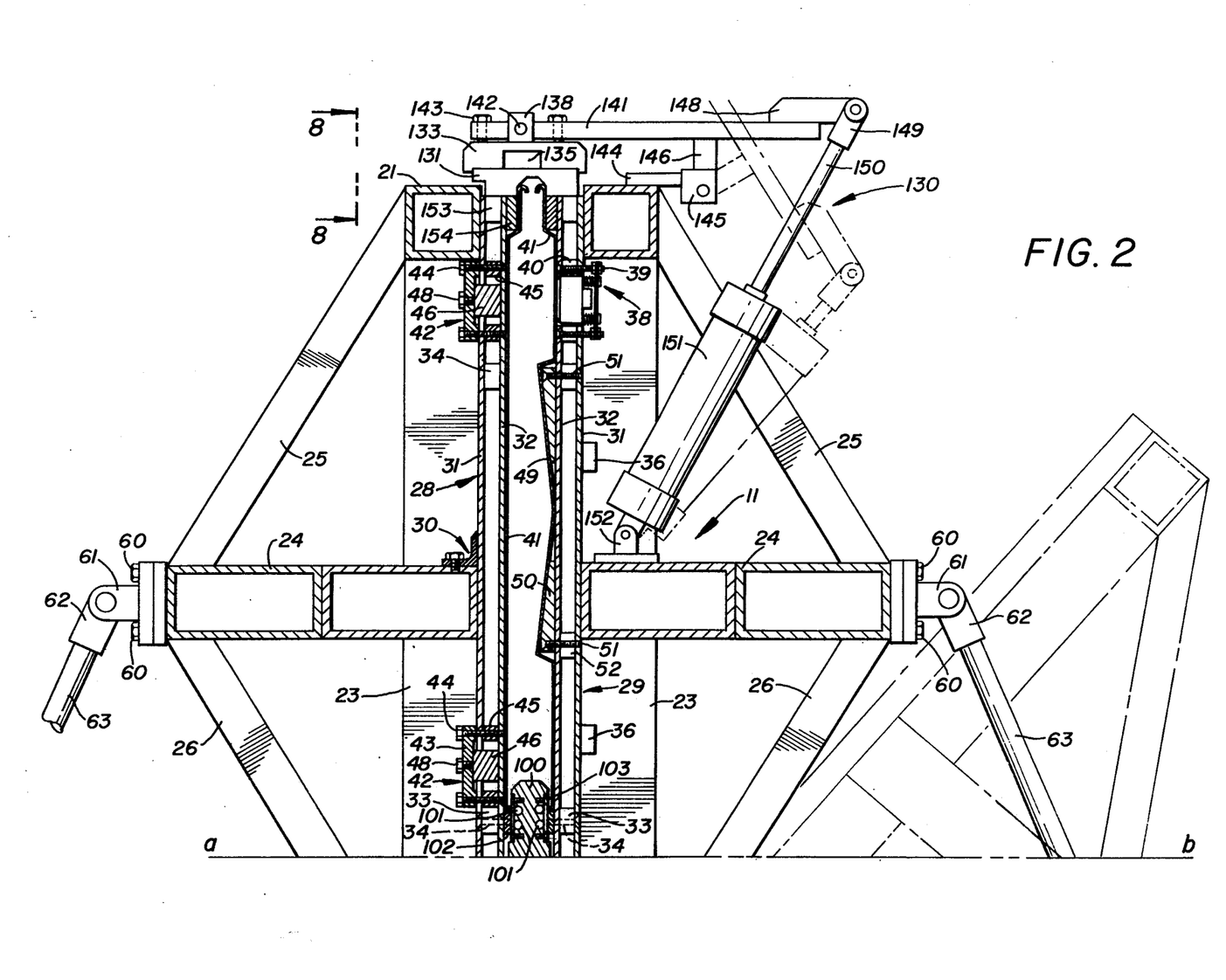
FIGS. 2 and 2A constitute a vertical sectional view taken substantially along line 2—2 of FIG. 1 being broken along match lines $ab-a'b'$ and for clarity showing some elements that would otherwise be sectioned in elevation.
Figure 2A:
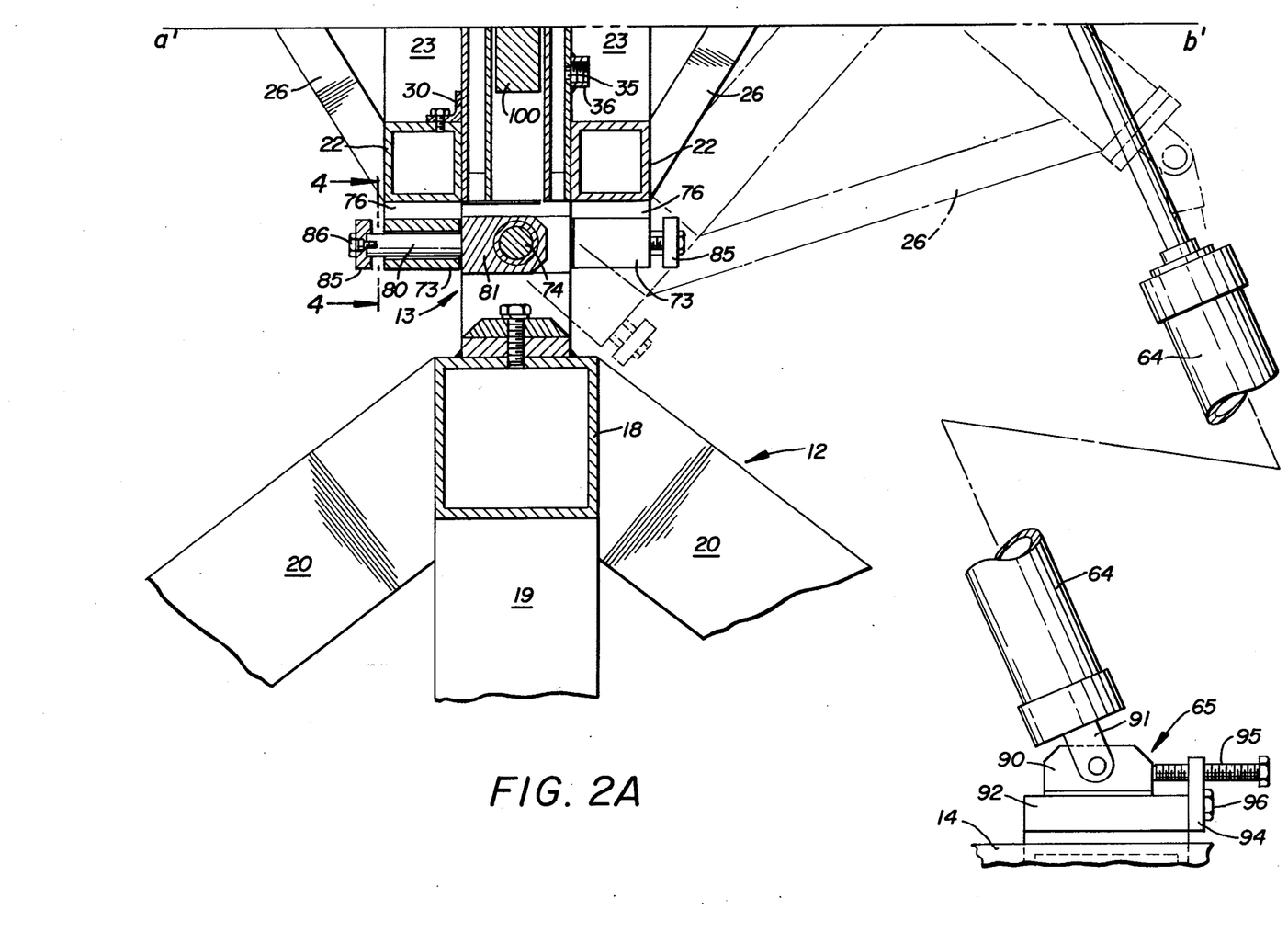

As best shown in FIGS. 2 and 2A, upper framework section 11 includes two longitudinally extending upper beams 21 and two longitudinally extending lower beams 22 spanned periodically by vertical beams 23. Upper framework section 11 further includes laterally extending supports 24 which are mounted generally centrally of beams 23 and, as shown in FIG. 2, extend laterally outwardly therefrom, being supported at their outer end by latticework 25 and 26 extending between supports 24 and beams 21 and 22 respectively.

Beams 21, 22 and 23 carry platens indicated generally by the numerals 28 and 29 by means of a plurality of angle iron and bolt combinations, two of which are shown in FIGS. 2 and 2A and indicated by the numeral 30. Each platen includes an outside sheet of material 31, usually steel, and an inside sheet of material 32, usually aluminum. Sheets 31 and 32 are held together and maintained spaced apart by periodic spacers 33 and machine screws 34.

Each outside sheet 31 of platens 28 and 29 includes a plurality of small apertures 35 therein through which, in conjunction with suitable fittings 36, may pass hot water or some other medium which is thus retained between sheets 31 and 32 to warm the platens 28 and 29. An electrical sensor assembly, somewhat schematically shown in conjunction with platen 29 in FIG. 2 and indicated generally by the numeral 38, controls the temperature of the water and will not permit operation of the entire apparatus until such time that the desired temperature, usually about 120° F., is achieved. Sensor assembly 38 is held against platen 29 by screws 39 which extend through spacers 40 that are similar to spacers 33 previously described.

The inside sheet 32 of each platen receives a skin 41 of metallic material which forms the outside of the panel being manufactured. The skins 41 are selectively held against platens 28 and 29 by randomly spaced electromagnet assemblies 42, two of which are shown in FIG. 2 in conjunction with platen 28. Electromagnet assemblies 42 include a casing 43 held to the platens by screws 44 with spacers 45 being located between sheets 31 and 32. The magnet 46, itself, is held against inside sheet 32 by set screw 48. Magnets 46 are operated by an electrical control circuit (not shown) so that they are activated to hold the skins 41 against the platens during loading and molding operations to be hereinafter described, and are selectively deactivated to release the skins during unloading operations. In the event that nonferrous skins were used to form the panels, assemblies 42 could be replaced by a vacuum system as would be evident to one skilled in the art.

Skins 41 can take on any shape which may be desired by the panel manufacturer. Often a decorative facing for one of the skins is provided. For example, the skin 41 which is held against platen 29 is shown as having a sculptured surface 49 formed therein. In order to prevent this surface from buckling during the molding operation, a backup insert 50, configured to correspond to surface 49, can be fastened to the platen. Insert 50 is shown as being held to platen 29 by screws 51 with spacers 52 between sheets 31 and 32 being provided.

Periodically along the end of laterally extending supports 24 there is mounted, as by bolts 60, a clevis 61 which receives a clevis eye 62 affixed to the end of a piston rod 63 of hydraulic cylinder 64. Cylinder 64 is pivotable on a mounting mechanism, indicated generally by the numeral 65 and shown in more detail in FIG. 6 to be hereinafter described. Mounting mechanism 65 is carried on base plate 14. Actuation of cylinder 64 to retract rod 63 pivots the upper framework 11 of carriage 10 about hinge assembly 13 to swing framework 11 including platens 28 and 29 and all their associated members, just described, to an open position as shown in chain lines in FIGS. 2 and 2A.

Figure 4:
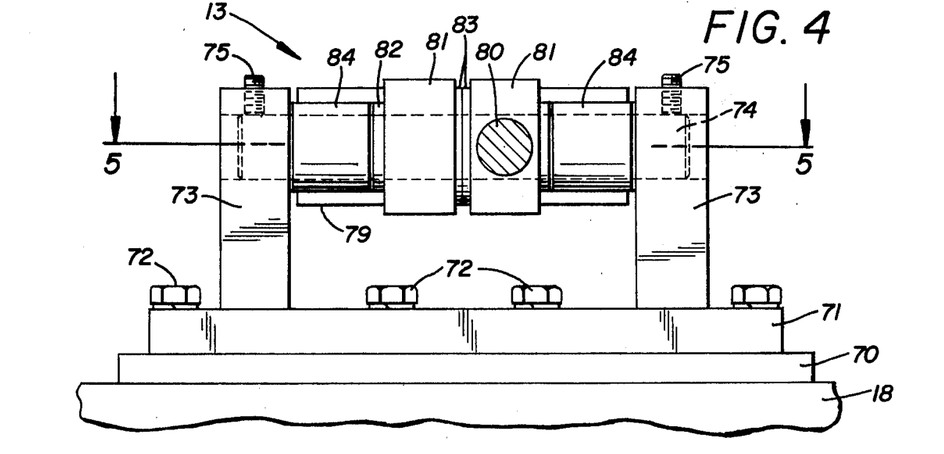
FIG. 4 is a sectional view taken substantially along line 4—4 of FIG. 2A.
Figure 5:
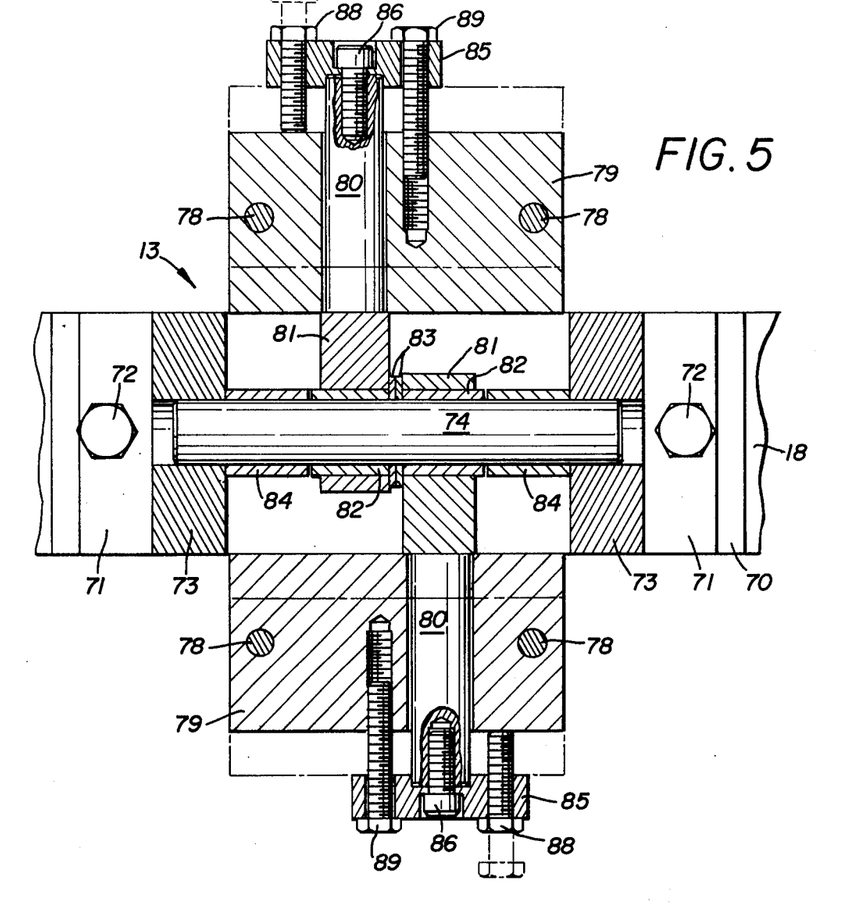
FIG. 5 is a sectional view taken substantially along line 5—5 of FIG. 4.

A hinge assembly 13, of which there are a plurality spaced longitudinally along carriage 10, is shown in FIG. 2A but the details thereof are best shown in FIGS. 4 and 5. A spacer plate 70 is welded to support beam 18 of the lower framework section 12 of carriage 10. A base plate 71 is attached, as by bolts 72, to plate 70 and carries upright stands 73 which are slotted at their upper end to receive a shaft 74. Shaft 74 is held fixed in place by set screws 75 and forms the axis about which the upper framework 11 pivots, as just described.

Lower beams 22 of the pivotal upper framework section 11 have spacers 76 (FIG. 2A) affixed thereto which are attached, as by bolts 78, to hinge adjusting blocks 79. A bearing arm 80 is received through each block 79 and carries, at its inner end, a clevis assembly 81 which rides with bushings 82 on stationary shaft 74. Bushings 82 are spaced from each other by washers 83 and spaced from stands 73 by cylindrical spacers 84.

A clamp plate 85 is fixed to the outer end of each bearing arm 80 by machine screw 86. A jack screw 88 is threaded through each plate 85 to rest against an outside surface of block 79. An adjusting screw 89 is slidably received through plate 85 and threaded into block 79. In this manner the hinge assembly 13 is capable of moving beams 22 and the members carried thereby apart to manufacture panels of varying thicknesses. As shown in solid lines in FIG. 5, the hinge assembly would be set to manufacture panels of a minimum thickness, for example, two inches. By backing off jack screws 88, screws 89 may be tightened to draw adjusting blocks 79 outward to the chain line position of FIG. 5 thereby spreading platens 28 and 29 so that thicker panels can be produced by the same machine.

Figure 6:
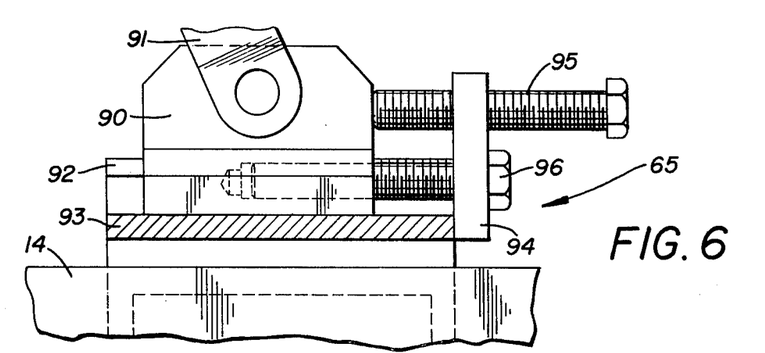
FIG. 6 is an enlarged view of a portion of the panel width adjusting mechanism shown in FIG. 2A.

Of course, although the pivot axis 74 is still the same no matter what thickness panels are being manufactured, because each clevis 61 has been moved outwardly, the mounting of cylinder 64 through mechanism 65 must also be adjusted. As best shown in FIG. 6, mounting mechanism 65 includes a clevis slide plate 90 which carries clevis eye 91 of cylinder 64. Plate 90 is movable along gib 92 and slides on plate 93 which is fixed to base plate 14. A vertical plate 94 is fixed to one edge of plate 93 and is threaded to receive jack screw 95 which rests against slide plate 90. An adjusting screw 96 is slidably received through plate 94 and threaded into slide plate 90. When the hinge assemblies 13 are adjusted in the manner just described, mounting mechanisms 65 are similarly adjusted by backing off jack screw 95 and tightening adjusting screw 96 to pull slide plate 90 to the right as seen in FIG. 6.

In order that the panels can be interconnected to form a wall, if desired, the ends thereof can be provided with male and female connectors. To this end, the bottom of each panel is provided with a core 100 (FIGS. 2 and 2A) which is a solid member extending the entire length of carriage 10 which forms a female fitting in the panel. Core 100 is provided with copper tubings 101 so that it can be heated by passing hot water therethrough. The core has attached thereto, on each side thereof, a Teflon strip 102, mounted by screws 103, so that as the platens close around the core, the skin supporting bars 104, held by screw 34, will not damage the core 100. Core 100 is movable upwardly and downwardly by a plurality of control mechanisms longitudinally spaced along carriage 10 and indicated generally by the numeral 105 as best shown in FIG. 3.

Figure 3:
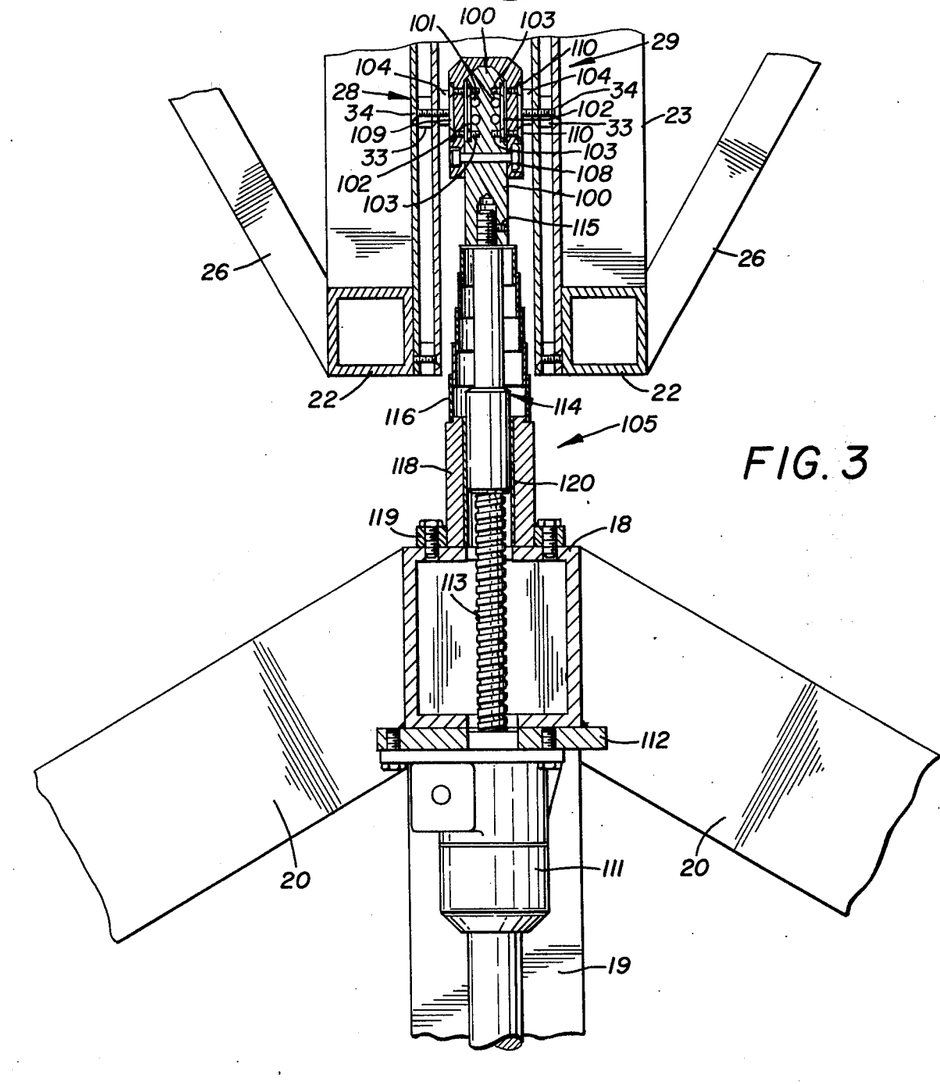
FIG. 3 is a vertical sectional view taken substantially along line 3—3 of FIG. 1.

The core 100 shown in FIG. 3 is depicted with an adaptor 106 which fits around core 100 and is held thereto by bolt 108. Adaptor 106 can be used in situations where larger thickness panels are being manufactured. Adaptor 106 is provided with Teflon strips 109, similar to strips 102, held thereto by screws 110.

Core 100, whether carrying an adaptor 106 or not, is raised to the position shown in FIG. 3 by control mechanisms 105. Each control mechanism includes a power jack 111 which is bolted to plate 112 which is in turn welded to beam 18. Screw 113 extends through beam 18 and carries shaft 114 which is threaded into the bottom of core 100 and held in place by set screw 115. A foldable sheath 116 covers shaft 114 to protect the same and rests on a centering guide tube 118 which is welded to a flange 119 that is bolted to beam 18. Suitable bearings 120 are provided between tube 118 and shaft 114.

Figure 1A:
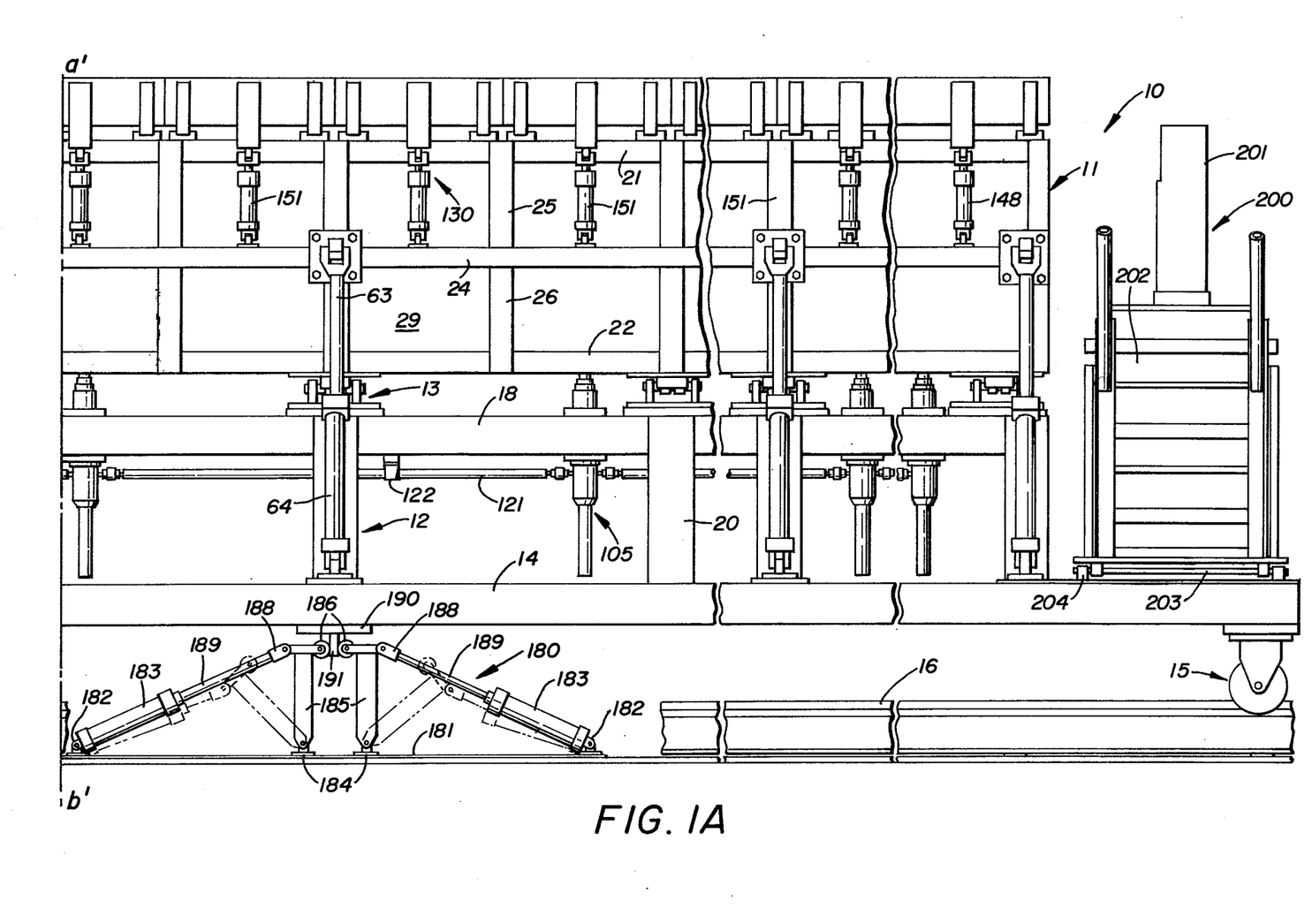

Referring to FIGS. 1 and 1A, all of the power jacks 111 are tied together by a control rod 121 supported by brackets 122 from beam 18 and driven by a common motor 123 shown schematically on the left-hand side of FIG. 1. Thus, the long core 100 can be evenly raised and lowered during the manufacturing process by means of motor 123 turning jack screws 113.

Figure 7:
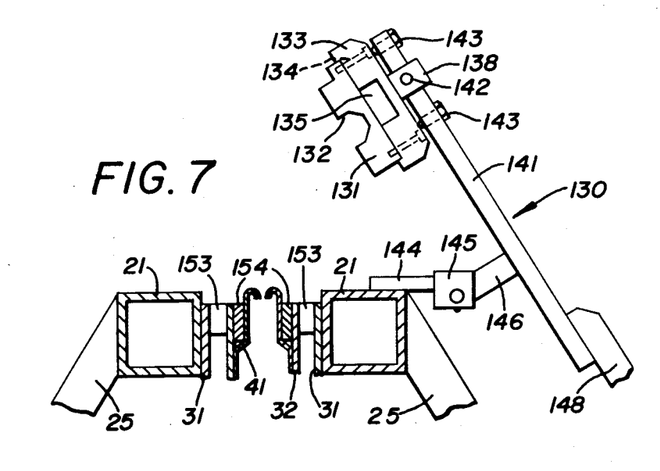
FIG. 7 is a sectional view showing some of the details of the panel lid construction shown in FIG. 2.
Figure 8:
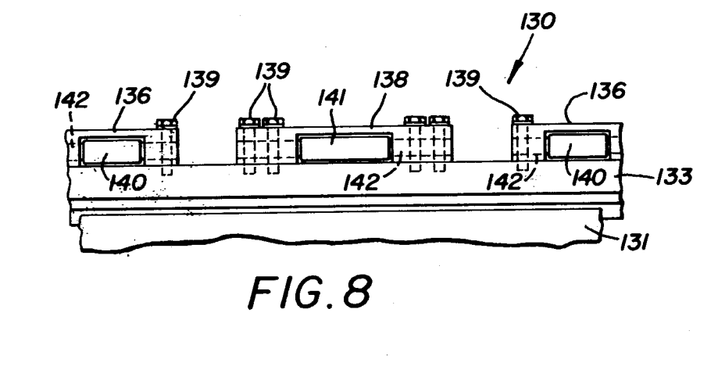
FIG. 8 is an elevational view taken substantially along line 8—8 of FIG. 2.

The male connection for the panels is formed at the top end thereof by lid assemblies indicated generally by the numeral 130 and best shown in FIGS. 2, 7 and 8. Carriage 10 is provided with a plurality of lid assemblies 130 each of which close off a portion of the panel, together closing the entire top end of the panel. Each lid assembly 130 includes a lid 131 which covers a portion of the longitudinal extent of the panel. Each lid 131 is recessed, as at 132, to form the male connector. The recess 132 shown is for smaller thickness panels whereas a lid with a larger recess, corresponding to the size of the female connection formed by the use of adaptor 106 shown in FIG. 3, would be provided for thicker panels.

Each lid 131 is carried by a clamp plate 133, as by bolts 134, which is provided with a bore 135 therein for receiving heated water to warm lids 131. Each lid assembly also includes two side pivot blocks 136 (FIG. 8) and a central pivot block 138 all mounted atop plate 133 by bolts 139. Pivot blocks 136 receive guide rods 140 therethrough while pivot block 138 receives carrying rod 141 therethrough. Rods 140 and 141 are slightly pivotally mounted with respect to blocks 136 and 138, respectively, by means of a shaft 142 extending transversely therethrough. In addition a pair of spring plungers 143 pass through rod 141 and exert an even force on plate 133. The pivotal mounts of rods 140 and 141 in addition to the action of plungers 143 assure proper seating of lid 131.

A plate 144 mounted on beam 21 carries three hinge assemblies 145 (FIG. 1) which are attached to the other end of rods 140 and 141 by linkage 146. As shown in FIGS. 2 and 7, carrying rod 141 is further attached to a support plate 148 that is connected, as by clevis 149, to piston rod 150 of hydraulic cylinder 151. Each cylinder 151 is connected to supports 24, as by a clevis connection 152. As shown in the solid lines of FIG. 2, lid assembly 130 is in a closed position so that lid 131 rests on spacer blocks 153 between sheets 31 and 32 of platens 28 and 29 and on inserts 154 behind the top hooked portion of skins 41 so that together with skins 41 and core 100, lids 131 form an enclosed cavity for the insulation material. Actuation of cylinder 151 retracts piston rod 150 to rotate rods 140 and 141 on pivot 145 to the chain line position of FIG. 2 (solid line position of FIGS. 1, 1A and 7) to remove lids 131 from their resting place on blocks 153 and inserts 154.

The manner in which the carriage 10, as described above, is best used in a system to manufacture panels will now be described with particular reference to FIG. 1 and schematic FIG. 9. In actuality, it is preferred that two carriages 10 be movable along tracks 16 to two of three positions, indicated A, B and C in FIG. 9. Positions A and C represent loading and unloading stations while position B represents the station at which the insulation material is injected into the panel.

A framework generally indicated by the numeral 160, is mounted around station B. Framework 160 includes upright supports 161, a horizontal crossbeam 162, and latticework 163. A nozzle 164 has tubing 165 which can extend down within skins 41 between platens 28 and 29. Nozzle 164 is mounted on a carriage, indicated generally by the numeral 166, which traverses back and forth longitudinally along beam 162 to fill the skins with an insulation material such as urethane foam. Nozzle 164 is also movable vertically along track 168 mounted on carriage 166, the purpose of which will be hereinafter described.

To summarize the complete operation of the system, it can be assumed that to begin a day's operation, one carriage 10 is at station C and the other at station A. If it were desired to load the carriage at station C, cylinder 64 would be actuated to rotate platens 28 and 29 on hinge assembly 13 to the chain line position of FIGS. 2 and 2A. At this point in time, the skins 41 are placed against the platens and the electromagnet assemblies 42 activated to hold the skins against the platens. Then motor 123 is operated to raise the core 100 into position at which time cylinder 64 again operates to close the platens around the core. At this time the lids 131 are in their open position as shown in FIGS. 1 and 1A. The carriage at station C may then be driven to station B.

The drive mechanism for each carriage 10 is generally indicated by the numeral 170 and shown in FIG. 1. A motor mount platform 171 is pivotally suspended from base plate structure 14, as by clevis mount 172. Platform 171 carries a motor and gear reducer 173 which drives pneumatic wheels 174 (one shown) between tracks 16. A flange 175 on platform 171 receives a threaded rod 176 which extends up into base plate 14. A spring 178 extends around rod 176 and exerts a downward pressure on platform 171 and therefore wheel 174 to assure that the primary weight of carriage 10 is on that wheel. Thus, activation of motor 173 moves the carriage from station to station.

Because the carriage 10 must be properly positioned within framework 160 in station B, and due to the potential misalignment between carriage 10 and framework 160 due to the possible inaccuracy of the stopping of motor 173, a centering and locking device, generally indicated by the numeral 180 in FIG. 1A, is provided at station B. Centering and locking device 180 is mounted on the floor centrally of station B and includes a base plate 181 which carries clevis mounts 182 for hydraulic cylinders 183. Plate 181 also carries clevis mounts 184 for one end of link arms 185 which carry rollers 186 at their other end. Link arms 185 are also connected, as by clevis mount 188, to piston rods 189 of cylinders 183. A plate 190 mounted centrally of base plate 14 of carriage 10, carries a stop lug 191. With cylinders 183 in the retracted chain line position, carriage 10 can move thereby stopping with lug 191 somewhere between the vertical planes of retracted rollers 186. The extension of rods 189 will then permit one of the rollers 186 to contact lug 191 and center the carriage as shown in the solid line position of FIG. 1A.

By maintaining rods 189 extended, carriage 10 is locked in place for operation at station B.

At station B, as soon as temperature sensor assembly 38 indicates that the water in platens 28 and 29 is at the proper temperature, nozzle 164 may be traversed along beam 162 injecting the constituents of the insulation material, such as urethane foam, through tubing 164. In the preferred form, nozzle 164 will make four passes along carriage 10 to fill the panel full of insulation material. It starts in the lowermost position, as shown in FIG. 9, and after making each pass it moves up track 168 to make the next pass, injecting the insulation material on top of the insulation material injected during the previous pass. This process continues and as the nozzle moves through the last pass, actuators (not shown) operate cylinders 151 to successively close lids 131. Due to the nature of the foam material, it will grow into male forming recess 132.

With the injection of the insulation material completed, cylinders 183 are activated to unlock carriage 10 which can then go to the unoccupied station, in the example being described, station C. Then a carriage 10 from station A, having been loaded with skins, can be moved to station B. While that skin is being filled with insulation material, the finished panel is removed from the carriage at station C in the following manner. The lids 131 are opened and the core 100 moved downwardly from between the platens. The electromagnets 46 on one platen only are deactivated and upon operation of cylinder 64, the finished panel will go with that one platen. When fully opened, the other electromagnets are deactivated and the panel can be removed, with the platens being ready to receive a new set of skins. Of course, should at any time it be desired to manufacture a panel of a different thickness, the adjustment of hinge assembly 13 and cylinder mounting mechanism 65 may be accomplished. In addition, adaptor 106 would be placed on core 100 and a new size lid 131 provided.

Figure 9:
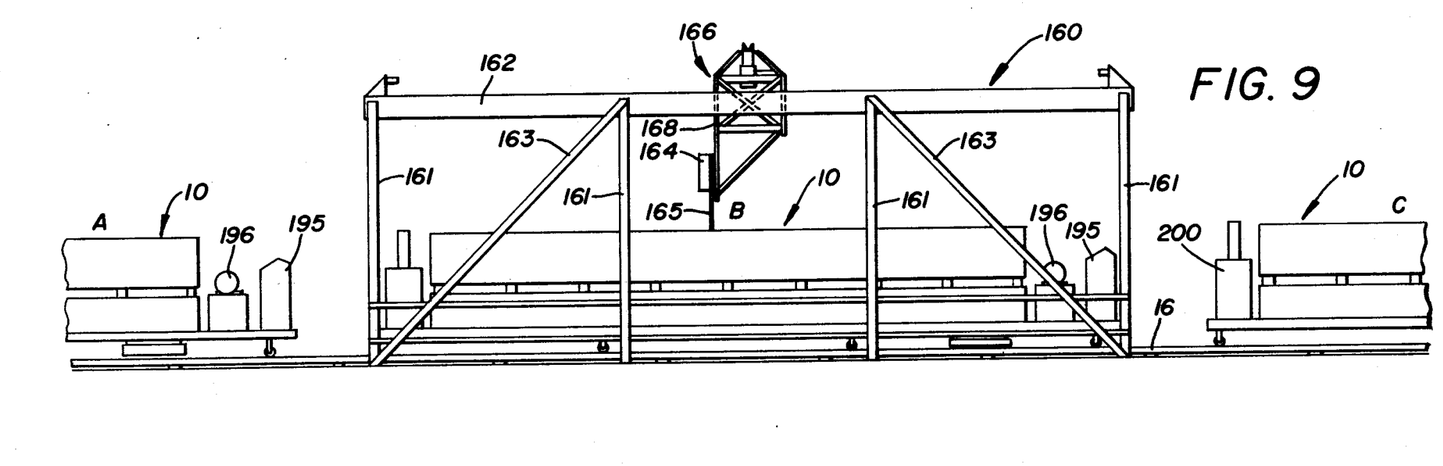
FIG. 9 is a view somewhat schematically showing the apparatus of FIGS. 1 and 1A in the environment of a system for manufacturing the panels.

So that each carriage 10 is a complete unit in and of itself, base plate 14 can carry the hydraulic power pack 195 and heating control pack 196 both shown schematically in FIG. 9. In addition, at the other end of each carriage 10, a waste drum, indicated generally by the numeral 200, is provided to receive chemicals which may be purged from the nozzle 164 during the daily operation. Drum 200 is shown in FIG. 1A in slightly more detail as including an upper extension 201 which includes slots (not shown) in the top thereof to receive nozzle tube 165. The chemicals purged from the nozzle tube will pass into the barrel 202. When it is desired to empty barrel 202, it is merely pivoted on axle 203 mounted in pivot blocks 204.

It should thus be evident that the carriage 10 provides a complete package for an automated system of manufacturing insulated panels and thus accomplishes the object of the invention to improve the panel manufacturing art.

We claim:

1. Apparatus for making panels having two sidewall forming skins and an insulation material therebetween comprising two mold platens, means selectively swinging each said mold platen about a common axis from an open position for loading the skins and unloading the panels to a closed position for receiving the insulation material, means selectively holding a skin on each said mold platen, core means extendable between said mold platens to close one end of the panel, nozzle means making multiple passes between the skins to dispense the insulation material between the skins, the first of said multiple passes dispensing the insulation material on said core means, and lid means activated during the last pass of said nozzle means to close the other end of the panel and to thereby form with the skins and said core means an enclosed cavity for the insulation material.

2. Apparatus according to claim 1 further comprising a carriage holding said mold platens.

3. Apparatus according to claim 2 further comprising track means, said carriage riding on said track means, and wherein said nozzle means suspended is above said track means and movable along said carriage.

4. Apparatus according to claim 1 wherein the ends of the panel are formed in the shape of corresponding male and female connectors.

5. Apparatus according to claim 4 wherein said core means forms the female connector end of the panel and further comprising means moving said core means from a position outside said platens to a position between said platens.

6. Apparatus according to claim 4 wherein said lid means forms the male connector.

7. Apparatus according to claim 1 further comprising hinge means carrying said lid means for pivotal movement, and cylinder means to pivot said lid means on said hinge means.

8. Apparatus according to claim 1 wherein said means selectively swinging each said mold platen includes a hinge assembly forming the common axis for said mold platens and cylinder means swinging said mold platens on said hinge assembly.

9. Apparatus according to claim 8 further comprising means adjusting said hinge assembly to form panels of varying thicknesses, said means adjusting said hinge assembly moving said platens selectively away from and toward each other while maintaining said common axis.

10. Apparatus according to claim 1 wherein said mold platens contain heated fluid.

11. Apparatus according to claim 10 further comprising means controlling the temperature of said heated fluid.

12. Apparatus according to claim 1 wherein said means selectively holding a skin includes electromagnet means.

13. Apparatus according to claim 12 wherein said electromagnet means are mounted in said mold platens.

14. A system for making panels having two sidewall forming skins and an insulation material therebetween comprising nozzle means for dispensing the installation material, framework means carrying said nozzle means, carriage means movable to a position within said framework means and beneath said nozzle means, means relatively moving said carriage means and said nozzle means to deposit the insulation material through a plurality of relative movements, means carried by said carriage means and holding the skins so that said nozzle means can dispense insulation material between the skins, hinge means swinging said means to hold the skins about a common axis, means adjusting said hinge means to make panels of varying thicknesses, and means moving said nozzle means generally vertically to a lowermost position between the skins for the first of said relative movements and to an uppermost position for the last of said relative movements.

15. A system according to claim 14 further comprising track means extending longitudinally under said framework means and wheels mounted on said carriage means and riding on said track means.

16. A system according to claim 15, said carriage means including at least two carriages, one being positionable beneath said nozzle means and the other being positionable outside said framework means.

17. A system according to claim 15 further comprising drive means moving said carriage means along said track means.

18. A system according to claim 15 further comprising centering means precisely positioning said carriage means beneath said framework means.

19. A system according to claim 18 wherein said centering means includes means locking said carriage in position beneath said framework means.

20. A system according to claim 14 wherein said nozzle means is movable over said carriage means by said means relatively moving said carriage means and said nozzle means.

21. A system according to claim 14 wherein said means holding the skins includes platen means, and magnetic means in said platen means.

22. A system according to claim 21 wherein said platen means includes two platens, said hinge means swinging said platens about a common axis.

23. A system according to claim 22 further comprising core means carried by said carriage forming one end of the panel, and means moving said core means to a position between said platens.

24. A system according to claim 22 further comprising lid means carried by said carriage forming one end of the panel, and means positioning said lid means over the ends of said platens after said nozzle means has dispensed the insulation material.

25. A system according to claim 24 wherein said lid means includes a plurality of lids each moving over the ends of the platens during the last of said relative movements between said nozzle means and said carriage means.

* * * * *